United States Patent
Zhang et al.

(10) Patent No.: US 12,089,221 B2
(45) Date of Patent: Sep. 10, 2024

(54) DATA SCHEDULING AND TRANSMITTING METHOD, NETWORK DEVICE, TERMINAL, AND COMPUTER STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Yi Zhang, Beijing (CN); Liang Xia, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

(*) Notice: Subject to any disclaimer, the term of this patent is extended or adjusted under 35 U.S.C. 154(b) by 841 days.

(21) Appl. No.: 17/265,319

(22) PCT Filed: Jul. 31, 2019

(86) PCT No.: PCT/CN2019/098749
§ 371 (c)(1),
(2) Date: Feb. 2, 2021

(87) PCT Pub. No.: WO2020/029857
PCT Pub. Date: Feb. 13, 2020

(65) Prior Publication Data
US 2021/0258935 A1    Aug. 19, 2021

(30) Foreign Application Priority Data
Aug. 6, 2018   (CN) .......................... 201810887067.X

(51) Int. Cl.
H04W 72/04    (2023.01)
H04W 28/02    (2009.01)
H04W 72/23    (2023.01)

(52) U.S. Cl.
CPC ....... *H04W 72/23* (2023.01); *H04W 28/0263* (2013.01)

(58) Field of Classification Search
CPC .......................... H04W 72/23; H04W 28/0263
(Continued)

(56) References Cited

U.S. PATENT DOCUMENTS 8,649,348 B2    2/2014  Huang
11,251,912 B2 *  2/2022  Jiao ....................... H04L 5/0092
(Continued)

FOREIGN PATENT DOCUMENTS

CN    101932007 A    12/2010
CN    101990777 3     1/2013
(Continued)

OTHER PUBLICATIONS

"DCI Design for URLLC", May 2018, 3GPP TSG RAN WG1, Meeting #93, R1-1805902, Busan, Korea, Agenda Item: 7.1.3.1.4, Source: Huawei, HiSilicon, 3 pgs.
(Continued)

*Primary Examiner* — Christopher M Crutchfield
*Assistant Examiner* — Jean F Voltaire
(74) *Attorney, Agent, or Firm* — Cooper Legal Group, LLC

(57) ABSTRACT

Disclosed are a data scheduling and transmitting method, a network device, a terminal, and a computer storage medium. The method comprises: a network device configures a first mapping relationship between a logic channel and a physical
(Continued)

layer service identifier, or configures a second mapping relationship between a logic channel group and the physical layer service identifier.

18 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2008/0139214 | A1 | 6/2008 | Sun |
| 2012/0093070 | A1* | 4/2012 | Huang ................ H04W 84/047 |
| | | | 370/315 |
| 2017/0086081 | A1 | 3/2017 | Kim |
| 2017/0332214 | A1* | 11/2017 | Hu .......................... H04W 4/08 |
| 2021/0058905 | A1* | 2/2021 | Ganesan ................... H04L 5/14 |

FOREIGN PATENT DOCUMENTS

| | | |
|---|---|---|
| CN | 106455095 A | 2/2017 |
| CN | 106470398 A | 3/2017 |
| CN | 107889259 A | 4/2018 |
| CN | 108307323 A | 7/2018 |
| CN | 108337214 A | 7/2018 |
| JP | 2019515594 A | 6/2019 |
| KR | 20170036623 A | 4/2017 |
| WO | 2017197264 A1 | 11/2017 |

OTHER PUBLICATIONS

"BSR Issue for One LCG Case", Jul. 2018, 3GPP TSG-RAN WG2, Adhoc NR#1807, R2-1810230, Montreal, Canada, Agenda item: 10.3.1.6, Source: Huawei, HiSilicon, 8 pgs.
"UL Power Control for MIMO", Apr. 2017, 3GPP TSG RAN WG1#88 bis, R1-1705978, Spokane, WA, USA, Agenda item: 8.1.2.5, Source: Nokia, Alcatel-Lucent Shanghai Bell, 5 pgs.
First Office Action of the Japanese application No. 2021-506314, issued on Mar. 1, 2022, 8 pgs.
"Consideration on 2-step RA", Jan. 2017, 3GPP TSG RAN WG2, Meeting Ad Hoc, R2-1700205, Source: CATT, Spokane, USA, 6 pages.
"[Draft] Reply LS on Handling of Multiple Numerologies in FeMBMS", Apr. 2018, 3GPP TSG RAN WG2, Meeting #101Bis, R2-1806297, Source: Qualcomm, Sanya, China, 1 page.
"Logical channel prioritization and transmission profiles", 2017, Source: Ericsson, 3GPP TSG-RAN WG2 #99, Tdoc R2-1709474, Berlin, Germany, 4 pgs.
"Power Control for Transmissions with Different Service Requirements", 2018, Source: InterDigital, Inc., 3GPP TSG RAN WG1 RAN1#92, R1-1802578, Athens, Greece, 3 pgs.
Second Office Action of the Chinese application No. 201810887067.X, issued on Jul. 5, 2021, 19 pgs.
"Considerations on UCI multiplexing for NR URLLC", 2018, Source: Catt, 3GPP TSG RAN WG1 Meeting #93 R1-1806297, Busan, Korea, 2 pgs.
"DCI design for URLLC", 2017, Source: Huawei, HiSilicon, 3GPP TSG RAN WG1 NR Meeting #90bis, R1-1717088, Prague, Czech Republic, 3 pgs.
Supplementary European Search Report in the European application No. 19847320.9, issued on Sep. 29, 2021, 10 pgs.
"Remaining issues on resource allocation and TBS", 2018, Source: Huawei, HiSilicon, 3GPP TSG RAN WG1 Meeting #92, R1-1801343, Athens, Greece, 13 pgs.
Notice of Allowance of the Chinese application No. 201810887067.X, issued on Nov. 29, 2021, 6 pgs.
International Search Report in the international application No. PCT/CN2019/098749, mailed on Oct. 10, 2019, 2 pgs.
English translation of the Written Opinion of the International Search Authority in the international application No. PCT/CN2019/098749, mailed on Oct. 10, 2019, 4 pgs.
InterDigital Inc. "Logical Channel Selection in LCP", 3GPP TSG-RAN WG2 #99bis, R2-1710660, mailed on Oct. 13, 2017, 4 pgs,.
LG Electronics, "Remaining issues on UL data transmission procedure", 3GPP TSG RAN WG1 Meeting #93 R1-1806628, Busan, Korea, May 21-25, 2018, the whole document. 7 pages.
Vivo, "Remaining issues on UL data transmission for URLLC", 3GPP TSG RAN WG1 Meeting #92bis R1-1806070, Busan, Korea, May 21-25, 2018, the whole document. 5 pages.
Ericsson, "RAN1 decisions for WI Ultra Reliable Low Latency Communication for LTE (LTE_HRLLC)-per topic", 3GPP TSG RAN WG1 Meeting #93 R1-1807583, Busan, South Korea, May 21-25, 2018, the whole document. 12 pages.
CMCC, "Discussion on remaining issues of new RNTI for URLLC", 3GPP TSG RAN WG1 Meeting #94 R1-1808846, Gothenburg, Sweden, Aug. 20-4, 2018, the whole document. 5 pages.

\* cited by examiner

DATA SCHEDULING AND TRANSMITTING METHOD, NETWORK DEVICE, TERMINAL, AND COMPUTER STORAGE MEDIUM

CROSS-REFERENCE TO RELATED APPLICATIONS

The application is submitted based on a Chinese patent application No. 201810887067.X, filed on Aug. 6, 2018, and claims the priority from the Chinese patent application, the entire contents of which are incorporated herein by reference.

TECHNICAL FIELD

The disclosure relates to wireless communication technology, and in particular, to a method for scheduling data and a method for transmitting data, a network device, a terminal, and a computer storage medium.

BACKGROUND

On one hand, an identifier (ID) and priority of a logical channel and some limitations on resource usage and scheduling of the logical channel are configured in logical channel configuration. The priority of logical channel reflects the priority of service to some extent, and data of a logical channel with a higher priority is preferentially included in Media Access Control Protocol Data Unit (MAC PDU). However, at present, there is no effective solution yet on how to determine a mapping relationship between a logical channel and a physical layer service identifier.

On the other hand, New Radio (NR) supports multi-slot scheduling. For example, in uplink/downlink multi-slot scheduling, a Transport Block (TB) may be transmitted many times according to the configuration. Such multi-slot scheduling does not distinguish between services, that is, no matter it is a Enhance Mobile Broadband (eMBB) service or an Ultra Reliable Low Latency Communication (URLLC) service, when it is configured with the multi-slot scheduling, times of transmitting TB are the same; however, the reliability requirements of the URLLC service and the eMBB service are different, and the current multi-slot scheduling method cannot meet the needs of different services.

SUMMARY

In order to solve the existing technical problem, the embodiments of the disclosure provide a method for scheduling and transmitting data, a network device, a terminal, and a computer storage medium.

In order to achieve the above objective, the technical solutions of the embodiments of the disclosure are implemented as follows:

The embodiment of the disclosure provides a method for scheduling data, including:
configuring, by a network device, a first mapping relationship between a logical channel and a physical layer service identifier, or a second mapping relationship between a logical channel group and the physical layer service identifier.

In an optional embodiment of the disclosure, the method further includes:
determining, by the network device according to the first mapping relationship, the physical layer service identifier corresponding to the logical channel where data is located;

or, determining, by the network device according to the second mapping relationship, the physical layer service identifier corresponding to the logical channel group where data is located; and
scheduling, by the network device according to first downlink control information corresponding to the physical layer service identifier, the data.

In an optional embodiment of the disclosure, the physical layer service identifier includes: Radio Network Temporary Identifier (RNTI) configured to scramble downlink control information, downlink control information format, content carried by the downlink control information.

In an optional embodiment of the disclosure, different logical channels or different logical channel groups correspond to different RNTIs configured to scramble downlink control information;
different logical channels or different logical channel groups correspond to different downlink control information formats; and
contents carried by the downlink control information corresponding to different logical channels or different logical channel groups are different.

In an optional embodiment of the disclosure, the method further includes: sending, by the network device, at least one of the first mapping relationship or the second mapping relationship to a terminal.

In an optional embodiment of the disclosure, the method further includes: configuring, by the network device, at least one set of aggregation factor parameters; the aggregation factor parameter representing times of transmitting at least one of uplink data or downlink data repeatedly; and
sending, by the network device, the at least one set of aggregation factor parameters to a terminal.

In an optional embodiment of the disclosure, the method further includes: configuring, by the network device, a third mapping relationship between the physical layer service identifier and the aggregation factor parameter; or
configuring, by the network device, a fourth mapping relationship between a physical layer service identifier group and the aggregation factor parameter; herein the physical layer service identifier group includes at least one physical layer service identifier.

In an optional embodiment of the disclosure, the configuring, by the network device, the third mapping relationship between the physical layer service identifier and the aggregation factor parameter includes: configuring, by the network device according to a predefined manner, the third mapping relationship between the physical layer service identifier and the aggregation factor parameter; and
the configuring, by the network device, the fourth mapping relationship between the physical layer service identifier group and the aggregation factor parameter includes: configuring, by the network device according to a predefined manner, the fourth mapping relationship between the physical layer service identifier group and the aggregation factor parameter.

The embodiment of the disclosure also provides a method for scheduling data, including:
configuring, by a terminal, a first mapping relationship between a logical channel and a physical layer service identifier, or a second mapping relationship between a logical channel group and the physical layer service identifier.

In an optional embodiment of the disclosure, the method further includes: determining, by the terminal according to the received first downlink control information, a corresponding first physical layer service identifier; and mapping, by the terminal according to the first mapping relationship, data to the logical channel corresponding to the first physical layer service identifier, or mapping, by the terminal according to the second mapping relationship, data to the logical channel group corresponding to the first physical layer service identifier.

In an optional embodiment of the disclosure, the physical layer service identifier includes: Radio Network Temporary Identifier (RNTI) configured to scramble downlink control information, downlink control information format, content carried by the downlink control information.

In an optional embodiment of the disclosure, different logical channels or different logical channel groups correspond to different RNTIs configured to scramble downlink control information;
  downlink control information formats corresponding to different logical channels or different logical channel groups are different; and
  contents carried by the downlink control information corresponding to different logical channels or different logical channel groups are different.

In an optional embodiment of the disclosure, the configuring, by the terminal, the first mapping relationship between the logical channel and the physical layer service identifier includes: configuring, based on a preappointed manner, the first mapping relationship between the logical channel and the physical layer service identifier for the terminal; and
  the configuring the second mapping relationship between the logical channel group and the physical layer service identifier includes:
  configuring, based on a preappointed manner, the second mapping relationship between the logical channel group and the physical layer service identifier for the terminal.

In an optional embodiment of the disclosure, the configuring, by the terminal, the first mapping relationship between the logical channel and the physical layer service identifier includes: receiving, by the terminal, the first mapping relationship sent by a network device;
  the configuring the second mapping relationship between the logical channel group and the physical layer service identifier includes:
  receiving, by the terminal, the second mapping relationship sent by the network device.

In an optional embodiment of the disclosure, the method further includes:
  receiving, by the terminal, at least one set of aggregation factor parameters sent by the network device; the aggregation factor parameter representing times of transmitting at least one of uplink data or downlink data repeatedly.

In an optional embodiment of the disclosure, the method further includes:
  configuring, by the terminal, a third mapping relationship between the physical layer service identifier and the aggregation factor parameter; or
  configuring, by the terminal, a fourth mapping relationship between a physical layer service identifier group and the aggregation factor parameter; herein the physical layer service identifier group includes at least one physical layer service identifier.

In an optional embodiment of the disclosure, the configuring, by the terminal, the third mapping relationship between the physical layer service identifier and the aggregation factor parameter includes: configuring, by the terminal according to a predefined manner, the third mapping relationship between the physical layer service identifier and the aggregation factor parameter; and
  the configuring, by the terminal, the fourth mapping relationship between the physical layer service identifier group and the aggregation factor parameter includes: configuring, by the terminal according to a predefined manner, the fourth mapping relationship between the physical layer service identifier group and the aggregation factor parameter.

In an optional embodiment of the disclosure, the method further includes: determining, by the terminal according to the received second downlink control information, a corresponding second physical layer service identifier;
  determining, by the terminal according to the third mapping relationship or the fourth mapping relationship, a first aggregation factor parameter corresponding to the second physical layer service identifier; and
  transmitting, by the terminal according to the first aggregation factor parameter, data.

In an optional embodiment of the disclosure, different aggregation factor parameters correspond to different RNTIs configured to scramble downlink control information;
  downlink control information formats corresponding to different aggregation factor parameters are different; and
  contents carried by the downlink control information corresponding to different aggregation factor parameters are different.

The embodiment of the disclosure also provides a method for transmitting data, including:
  configuring, by a network device, a third mapping relationship between a physical layer service identifier and an aggregation factor parameter; or a fourth mapping relationship between a physical layer service identifier group and the aggregation factor parameter;
  herein the aggregation factor parameter represents times of transmitting at least one of uplink data or downlink data repeatedly; and the physical layer service identifier group includes at least one physical layer service identifier.

In an optional embodiment of the disclosure, the method further includes before configuring, by the network device, the third mapping relationship between the physical layer service identifier and the aggregation factor parameter; or the fourth mapping relationship between the physical layer service identifier group and the aggregation factor parameter:
  configuring, by the network device, at least one set of aggregation factor parameters; and
  sending, by the network device, the at least one set of aggregation factor parameters to a terminal.

In an optional embodiment of the disclosure, the configuring, by the network device, the third mapping relationship between the physical layer service identifier and the aggregation factor parameter includes: configuring, by the network device according to a predefined manner, the third mapping relationship between the physical layer service identifier and the aggregation factor parameter; and
  the configuring, by the network device, the fourth mapping relationship between the physical layer service identifier group and the aggregation factor parameter includes: configuring, by the network device according to a predefined manner, the fourth mapping relationship between the physical layer service identifier group and the aggregation factor parameter.

In an optional embodiment of the disclosure, the method further includes: configuring, by the network device, a first mapping relationship between a logical channel and the physical layer service identifier, or a second mapping relationship between a logical channel group and the physical layer service identifier.

In an optional embodiment of the disclosure, the method further includes:
  determining, by the network device according to the first mapping relationship, the physical layer service identifier corresponding to the logical channel where data is located; or, determining, by the network device according to the second mapping relationship, the physical layer service identifier corresponding to the logical channel group where data is located; and
  scheduling, by the network device according to first downlink control information corresponding to the physical layer service identifier, the data.

In an optional embodiment of the disclosure, the physical layer service identifier includes: Radio Network Temporary Identifier (RNTI) configured to scramble downlink control information, downlink control information format, content carried by the downlink control information.

In an optional embodiment of the disclosure, different logical channels or different logical channel groups correspond to different RNTIs configured to scramble downlink control information;
  different logical channels or different logical channel groups correspond to different downlink control information formats; and
  contents carried by the downlink control information corresponding to different logical channels or different logical channel groups are different.

In an optional embodiment of the disclosure, the method further includes: sending, by the network device, at least one of the first mapping relationship or the second mapping relationship to a terminal.

The embodiment of the disclosure also provides a method for transmitting data, including:
  configuring, by a terminal, a third mapping relationship between a physical layer service identifier and an aggregation factor parameter; or a fourth mapping relationship between a physical layer service identifier group and the aggregation factor parameter;
  herein the aggregation factor parameter represents times of transmitting at least one of uplink data or downlink data repeatedly; and the physical layer service identifier group includes at least one physical layer service identifier.

In an optional embodiment of the disclosure, the method also includes before configuring, by the terminal, the third mapping relationship between the physical layer service identifier and the aggregation factor parameter; or the fourth mapping relationship between the physical layer service identifier group and the aggregation factor parameter:
  receiving, by the terminal, at least one set of aggregation factor parameters sent by the network device.

In an optional embodiment of the disclosure, the configuring, by the terminal, the third mapping relationship between the physical layer service identifier and the aggregation factor parameter includes: configuring, by the terminal according to a predefined manner, the third mapping relationship between the physical layer service identifier and the aggregation factor parameter.

The configuring, by the terminal, the fourth mapping relationship between the physical layer service identifier group and the aggregation factor parameter includes: configuring, by the terminal according to a predefined manner, the fourth mapping relationship between the physical layer service identifier group and the aggregation factor parameter.

In an optional embodiment of the disclosure, the method further includes:
  determining, by the terminal according to the received second downlink control information, a corresponding second physical layer service identifier;
  determining, by the terminal according to the third mapping relationship or the fourth mapping relationship, a first aggregation factor parameter corresponding to the second physical layer service identifier; and
  transmitting, by the terminal according to the first aggregation factor parameter, data.

In an optional embodiment of the disclosure, the physical layer service identifier includes: Radio Network Temporary Identifier (RNTI) configured to scramble downlink control information, downlink control information format, content carried by the downlink control information.

In an optional embodiment of the disclosure, different aggregation factor parameters correspond to different RNTIs configured to scramble downlink control information;
  downlink control information formats corresponding to different aggregation factor parameters are different; and
  contents carried by the downlink control information corresponding to different aggregation factor parameters are different.

In an optional embodiment of the disclosure, the method further includes: configuring, by the terminal, a first mapping relationship between a logical channel and the physical layer service identifier, or a second mapping relationship between a logical channel group and the physical layer service identifier.

In an optional embodiment of the disclosure, the method further includes: determining, by the terminal according to the received first downlink control information, a corresponding first physical layer service identifier; and
  mapping, by the terminal according to the first mapping relationship, data to the logical channel corresponding to the first physical layer service identifier, or mapping, by the terminal according to the second mapping relationship, data to the logical channel group corresponding to the first physical layer service identifier.

In an optional embodiment of the disclosure, different logical channels or different logical channel groups correspond to different RNTIs configured to scramble downlink control information;
  downlink control information formats corresponding to different logical channels or different logical channel groups are different; and
  contents carried by the downlink control information corresponding to different logical channels or different logical channel groups are different.

In an optional embodiment of the disclosure, the configuring, by the terminal, the first mapping relationship between the logical channel and the physical layer service identifier includes: configuring, based on a preappointed manner, the first mapping relationship between the logical channel and the physical layer service identifier for the terminal; and
  the configuring the second mapping relationship between the logical channel group and the physical layer service identifier includes:

configuring, based on a preappointed manner, the second mapping relationship between the logical channel group and the physical layer service identifier for the terminal.

In an optional embodiment of the disclosure, the configuring, by the terminal, the first mapping relationship between the logical channel and the physical layer service identifier includes: receiving, by the terminal, the first mapping relationship sent by a network device;

the configuring the second mapping relationship between the logical channel group and the physical layer service identifier includes:

receiving, by the terminal, the second mapping relationship sent by the network device.

The embodiment of the disclosure also provides a network device including a first configuration unit configured to configure a first mapping relationship between a logical channel and a physical layer service identifier, or a second mapping relationship between a logical channel group and the physical layer service identifier.

In an optional embodiment of the disclosure, the network device further includes a first determination unit and a first scheduling unit; herein the first determination unit is configured to determine, according to the first mapping relationship, the physical layer service identifier corresponding to the logical channel where data is located; or, to determine, according to the second mapping relationship, the physical layer service identifier corresponding to the logical channel group where data is located; and the first scheduling unit is configured to schedule, according to first downlink control information corresponding to the physical layer service identifier, the data.

In an optional embodiment of the disclosure, the physical layer service identifier includes: Radio Network Temporary Identifier (RNTI) configured to scramble downlink control information, downlink control information format, content carried by the downlink control information.

In an optional embodiment of the disclosure, different logical channels or different logical channel groups correspond to different RNTIs configured to scramble downlink control information;

different logical channels or different logical channel groups correspond to different downlink control information formats; and contents carried by the downlink control information corresponding to different logical channels or different logical channel groups are different.

In an optional embodiment of the disclosure, the network device further includes a first sending unit configured to send at least one of the first mapping relationship or the second mapping relationship to a terminal.

In an optional embodiment of the disclosure, the network device further includes a first sending unit;

the first configuration unit is configured to configure at least one set of aggregation factor parameters; the aggregation factor parameter representing times of transmitting at least one of uplink data or downlink data repeatedly; and the first sending unit is configured to send the at least one set of aggregation factor parameters to a terminal.

In an optional embodiment of the disclosure, the first configuration unit is further configured to configure a third mapping relationship between the physical layer service identifier and the aggregation factor parameter; or, to configure a fourth mapping relationship between a physical layer service identifier group and the aggregation factor parameter; herein the physical layer service identifier group includes at least one physical layer service identifier.

In an optional embodiment of the disclosure, the first configuration unit is configured to configure, according to a predefined manner, the third mapping relationship between the physical layer service identifier and the aggregation factor parameter; or, to configure, according to a predefined manner, the fourth mapping relationship between the physical layer service identifier group and the aggregation factor parameter.

The embodiment of the disclosure also provides a network device, including a second configuration unit configured to configure a third mapping relationship between a physical layer service identifier and an aggregation factor parameter; or, to configure a fourth mapping relationship between a physical layer service identifier group and the aggregation factor parameter;

herein the aggregation factor parameter represents times of transmitting at least one of uplink data or downlink data repeatedly; and the physical layer service identifier group includes at least one physical layer service identifier.

In an optional embodiment of the disclosure, the network device further includes a second sending unit;

the second configuration unit is further configured to before configuring, by the second configuration unit, the third mapping relationship between the physical layer service identifier and the aggregation factor parameter; or the fourth mapping relationship between the physical layer service identifier group and the aggregation factor parameter, configure at least one set of aggregation factor parameters;

the second sending unit is configured to send the at least one set of aggregation factor parameters to a terminal.

In an optional embodiment of the disclosure, the second configuration unit is configured to configure, according to a predefined manner, the third mapping relationship between the physical layer service identifier and the aggregation factor parameter; or, to configure, according to a predefined manner, the fourth mapping relationship between the physical layer service identifier group and the aggregation factor parameter.

In an optional embodiment of the disclosure, the second configuration unit is further configured to configure a first mapping relationship between a logical channel and the physical layer service identifier, or a second mapping relationship between a logical channel group and the physical layer service identifier.

In an optional embodiment of the disclosure, the network device further includes a second determination unit and a second scheduling unit;

herein the second determination unit is configured to determine, according to the first mapping relationship, the physical layer service identifier corresponding to the logical channel where data is located; or, to determine, according to the second mapping relationship, the physical layer service identifier corresponding to the logical channel group where data is located; and the second scheduling unit is configured to schedule, according to first downlink control information corresponding to the physical layer service identifier, the data.

In an optional embodiment of the disclosure, the physical layer service identifier includes: Radio Network Temporary Identifier (RNTI) configured to scramble downlink control information, downlink control information format, content carried by the downlink control information.

In an optional embodiment of the disclosure, different logical channels or different logical channel groups correspond to different RNTIs configured to scramble downlink control information;

different logical channels or different logical channel groups correspond to different downlink control information formats; and contents carried by the downlink control information corresponding to different logical channels or different logical channel groups are different.

In an optional embodiment of the disclosure, the network device further includes a second sending unit configured to send at least one of the first mapping relationship or the second mapping relationship to a terminal.

The embodiment of the disclosure also provides a terminal including a third configuration unit configured to configure a first mapping relationship between a logical channel and a physical layer service identifier, or a second mapping relationship between a logical channel group and the physical layer service identifier.

In an optional embodiment of the disclosure, the terminal further includes a third determination unit and a first data mapping unit;

herein the third determination unit is configured to determine, according to the received first downlink control information, a corresponding first physical layer service identifier; and the first data mapping unit is configured to map, according to the first mapping relationship, data to the logical channel corresponding to the first physical layer service identifier, or, to map, according to the second mapping relationship, data to the logical channel group corresponding to the first physical layer service identifier.

In an optional embodiment of the disclosure, the physical layer service identifier includes: Radio Network Temporary Identifier (RNTI) configured to scramble downlink control information, downlink control information format, content carried by the downlink control information.

In an optional embodiment of the disclosure, different logical channels or different logical channel groups correspond to different RNTIs configured to scramble downlink control information;

downlink control information formats corresponding to different logical channels or different logical channel groups are different; and contents carried by the downlink control information corresponding to different logical channels or different logical channel groups are different.

In an optional embodiment of the disclosure, the third configuration unit is configured to configure, based on a preappointed manner, the first mapping relationship between the logical channel and the physical layer service identifier for the terminal; or, to configure, based on a preappointed manner, the second mapping relationship between the logical channel group and the physical layer service identifier for the terminal.

In an optional embodiment of the disclosure, the third configuration unit is configured to receive the first mapping relationship sent by a network device; or, to receive the second mapping relationship sent by the network device.

In an optional embodiment of the disclosure, the terminal further includes a first transmission unit configured to receive at least one set of aggregation factor parameters sent by the network device; the aggregation factor parameter representing times of transmitting at least one of uplink data or downlink data repeatedly.

In an optional embodiment of the disclosure, the third configuration unit is further configured to configure a third mapping relationship between the physical layer service identifier and the aggregation factor parameter; or, to configure a fourth mapping relationship between a physical layer service identifier group and the aggregation factor parameter; herein the physical layer service identifier group includes at least one physical layer service identifier.

In an optional embodiment of the disclosure, the third configuration unit is configured to configure, according to a predefined manner, the third mapping relationship between the physical layer service identifier and the aggregation factor parameter; or, to configure, according to a predefined manner, the fourth mapping relationship between the physical layer service identifier group and the aggregation factor parameter.

In an optional embodiment of the disclosure, the terminal further includes a third determination unit and a first transmission unit;

the third determining unit is configured to determine, according to the received second downlink control information, a corresponding second physical layer service identifier; to determine, according to the third mapping relationship or the fourth mapping relationship, a first aggregation factor parameter corresponding to the second physical layer service identifier; and the first transmission unit is configured to transmit data according to the first aggregation factor parameter.

In an optional embodiment of the disclosure, different aggregation factor parameters correspond to different RNTIs configured to scramble downlink control information;

downlink control information formats corresponding to different aggregation factor parameters are different; and contents carried by the downlink control information corresponding to different aggregation factor parameters are different.

The embodiment of the disclosure also provides a terminal, including a fourth configuration unit configured to configure a third mapping relationship between a physical layer service identifier and an aggregation factor parameter; or a fourth mapping relationship between a physical layer service identifier group and the aggregation factor parameter;

herein the aggregation factor parameter represents times of transmitting at least one of uplink data or downlink data repeatedly; and the physical layer service identifier group includes at least one physical layer service identifier.

In an optional embodiment of the disclosure, the terminal further includes a second transmission unit configured to before configuring, by the fourth configuration unit, the third mapping relationship between the physical layer service identifier and the aggregation factor parameter; or the fourth mapping relationship between the physical layer service identifier group and the aggregation factor parameter: receive at least one set of aggregation factor parameters sent by the network device.

In an optional embodiment of the disclosure, the fourth configuration unit is configured to configure, according to a predefined manner, the third mapping relationship between the physical layer service identifier and the aggregation factor parameter; or, to configure, according to a predefined manner, the fourth mapping relationship between the physical layer service identifier group and the aggregation factor parameter.

In an optional embodiment of the disclosure, the terminal further includes a fourth determination unit and a second transmission unit;

herein the fourth determination unit is configured to determine, according to the received second downlink control information, a corresponding second physical layer service identifier; to determine, according to the third mapping relationship or the fourth mapping relationship, a first aggregation factor parameter corresponding to the second physical layer service identifier; and the second transmission unit is configured to transmit data according to the first aggregation factor parameter.

In an optional embodiment of the disclosure, the physical layer service identifier includes: Radio Network Temporary Identifier (RNTI) configured to scramble downlink control information, downlink control information format, content carried by the downlink control information.

In an optional embodiment of the disclosure, different aggregation factor parameters correspond to different RNTIs configured to scramble downlink control information;

downlink control information formats corresponding to different aggregation factor parameters are different; and contents carried by the downlink control information corresponding to different aggregation factor parameters are different.

In an optional embodiment of the disclosure, the fourth configuration unit is further configured to configure a first mapping relationship between a logical channel and the physical layer service identifier, or a second mapping relationship between a logical channel group and the physical layer service identifier.

In an optional embodiment of the disclosure, the terminal further includes a fourth determination unit and a second data mapping unit;

herein the fourth determination unit is configured to determine, according to the received first downlink control information, a corresponding first physical layer service identifier; and the second data mapping unit is configured to map, according to the first mapping relationship, data to the logical channel corresponding to the first physical layer service identifier, or, to map, according to the second mapping relationship, data to the logical channel group corresponding to the first physical layer service identifier.

In an optional embodiment of the disclosure, different logical channels or different logical channel groups correspond to different RNTIs configured to scramble downlink control information;

downlink control information formats corresponding to different logical channels or different logical channel groups are different; and contents carried by the downlink control information corresponding to different logical channels or different logical channel groups are different.

In an optional embodiment of the disclosure, the fourth configuration unit is configured to configure, based on a preappointed manner, the first mapping relationship between the logical channel and the physical layer service identifier for the terminal; or, to configure, based on a preappointed manner, the second mapping relationship between the logical channel group and the physical layer service identifier for the terminal.

In an optional embodiment of the disclosure, the fourth configuration unit is further configured to receive the first mapping relationship sent by a network device; or, to receive the second mapping relationship sent by the network device.

The embodiment of the disclosure also provides a computer-readable storage medium having stored thereon a computer program that when executed by a processor, implements steps of the method for scheduling data according to any one of the above network device side; or, that when executed by the processor implements steps of the method for scheduling data according to any one of the above terminal side; or, that when executed by the processor implements steps of the method for transmitting data according to any one of the above network device side; or, that when executed by the processor implements steps of the method for transmitting data according to any one of the above terminal side.

The embodiment of the disclosure also provides a network device, including a memory, a processor, and a computer program stored on the memory and executable on the processor, the processor implements steps of the method for scheduling data according to any one of the above network device side when executing the program; or, the processor implements steps of the method for transmitting data according to any one of the above network device side when executing the program.

The embodiment of the disclosure also provides a memory, a processor, and a computer program stored on the memory and executable on the processor, the processor implements steps of the method for scheduling data according to any one of the above terminal side when executing the program; or, the processor implements steps of the method for transmitting data according to any one of the above terminal sids when executing the program.

The method for scheduling and transmitting data, the network device, the terminal, and the computer storage medium provided by the embodiments of the disclosure, on one hand, configuring, by the network device or the terminal, the first mapping relationship between the logical channel and the physical layer service identifier, or the second mapping relationship between the logical channel group and the physical layer service identifier, so that different logical channels or different logical channel groups are used for different physical layer service identifiers, which ensures service requirements and improves system throughput. On the other hand, configuring, by the network device or the terminal, the third mapping relationship between the physical layer service identifier and the aggregation factor parameter; or the fourth mapping relationship between the physical layer service identifier group and the aggregation factor parameter, and the aggregation factor parameter representing times of transmitting at least one of uplink data or downlink data repeatedly; so that different aggregation factor parameters are mapped to different physical layer service identifiers, for services with lower reliability requirements, they correspond to smaller aggregation factor parameters, and for services with higher reliability requirements, they correspond to larger aggregation factor parameters, which avoids wasting of resources caused by configuring the same aggregation factor parameter and improves the system throughput.

DETAILED DESCRIPTION

The disclosure will be further described in detail below in conjunction with the drawings and specific embodiments.

Figure 1:
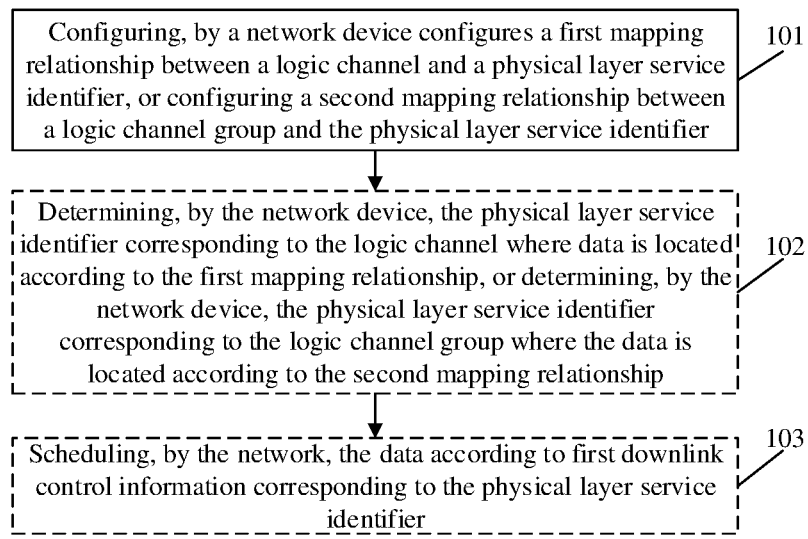
FIG. 1 is a first schematic flowchart of a method for scheduling data according to an embodiment of the disclosure.

The embodiment of the disclosure provides a method for scheduling data. FIG. 1 is a first schematic flowchart of a method for scheduling data according to an embodiment of the disclosure; as shown in FIG. 1, the method includes:

In S101: configuring, by a network device, a first mapping relationship between a logical channel and a physical layer service identifier, or a second mapping relationship between a logical channel group and the physical layer service identifier.

Here the network device may be a device such as a base station etc.

In the embodiment, the physical layer service identifier includes: Radio Network Temporary Identifier (RNTI) configured to scramble Downlink Control Information (DCI), Downlink Control Information format (DCI format), and content carried by the downlink control information. Herein different physical layer service identifiers may correspond to different service types, or correspond to different service priorities; it may be understood that different service types or different service priorities use different logical channels, or correspond to different DCI formats, or correspond to contents carried by different DCIs.

Herein different logical channels or different logical channel groups correspond to different RNTIs configured to scramble downlink control information; different logical channels or different logical channel groups correspond to different downlink control information formats; and contents carried by the downlink control information corresponding to different logical channels or different logical channel groups are different.

In the embodiment, the network device may configure, based on a preappointed manner, the first mapping relationship between the logical channel and the physical layer service identifier, or the second mapping relationship between the logical channel group and the physical layer service identifier.

In an optional embodiment of the disclosure, the method further includes:

In S102: determining, by the network device according to the first mapping relationship, the physical layer service identifier corresponding to the logical channel where data is located; or, determining, by the network device according to the second mapping relationship, the physical layer service identifier corresponding to the logical channel group where data is located.

In S103: scheduling, by the network device according to first downlink control information corresponding to the physical layer service identifier, the data.

In an optional embodiment of the disclosure, the network device sends at least one of the first mapping relationship or the second mapping relationship to a terminal.

As an example, the network device may send, through high-level signaling, at least one of the first mapping relationship or the second mapping relationship to the terminal.

In an optional embodiment of the disclosure, the method further includes: configuring, by the network device, at least one set of aggregation factor parameters; the aggregation factor parameter representing times of transmitting at least one of uplink data or downlink data repeatedly; and sending, by the network device, the at least one set of aggregation factor parameters to a terminal.

The method further includes: configuring, by the network device, a third mapping relationship between the physical layer service identifier and the aggregation factor parameter; or configuring, by the network device, a fourth mapping relationship between a physical layer service identifier group and the aggregation factor parameter; herein the physical layer service identifier group includes at least one physical layer service identifier. Here the aggregation factor parameter may be specifically a pdsch/pusch-AggregationFactor parameter, which represents times of transmitting at least one of uplink data or downlink data repeatedly. The pdsch/pusch-AggregationFactor parameter is located in Physical Uplink Shared Channel (PUSCH) configuration information and Physical Downlink Shared Channel (PDSCH) configuration information, for example, it may be configured as 2, 4, 8, and configured as 1 by default, which represents times of repetition of TB. When it is configured as 4, it represents that transmission is repeated 4 times seccessively in one scheduling.

As an implementation, the configuring, by the network device, the third mapping relationship between the physical layer service identifier and the aggregation factor parameter includes: configuring, by the network device according to a predefined manner, the third mapping relationship between the physical layer service identifier and the aggregation factor parameter; and the configuring, by the network device, the fourth mapping relationship between the physical layer service identifier group and the aggregation factor parameter includes: configuring, by the network device according to a predefined manner, the fourth mapping relationship between the physical layer service identifier group and the aggregation factor parameter.

According to the technical solution of the embodiment of the disclosure, on one hand, configuring, by the network device or the terminal, the first mapping relationship between the logical channel and the physical layer service identifier, or the second mapping relationship between the logical channel group and the physical layer service identifier, so that different logical channels or different logical channel groups are used for different physical layer service identifiers, which ensures service requirements and improves system throughput. On the other hand, configuring, by the network device or the terminal, the third mapping relationship between the physical layer service identifier and the aggregation factor parameter; or the fourth mapping relationship between the physical layer service identifier group and the aggregation factor parameter, and the aggregation factor parameter representing times of transmitting at least one of uplink data or downlink data repeatedly; so that different aggregation factor parameters are mapped to different physical layer service identifiers, for services with lower reliability requirements, they correspond to smaller aggregation factor parameters, and for services with higher reliability requirements, they correspond to larger aggregation factor parameters, which avoids wasting of resources caused by configuring the same aggregation factor parameter and improves the system throughput.

Figure 2:
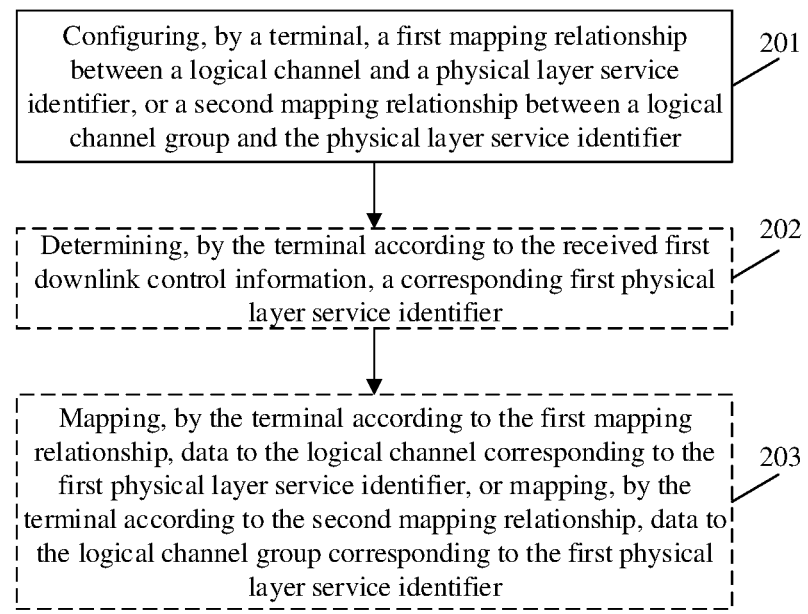
FIG. 2 is a second schematic flowchart of a method for scheduling data according to an embodiment of the disclosure.

The embodiment of the disclosure also provides a method for scheduling data. FIG. 2 is a second schematic flowchart of a method for scheduling data according to an embodiment of the disclosure; as shown in FIG. 2, the method includes:

In S201: configuring, by a terminal, a first mapping relationship between a logical channel and a physical layer service identifier, or a second mapping relationship between a logical channel group and the physical layer service identifier.

In the embodiment, the physical layer service identifier includes: Radio Network Temporary Identifier (RNTI) configured to scramble Downlink Control Information (DCI), Downlink Control Information format (DCI format), and content carried by the downlink control information. Herein different physical layer service identifiers may correspond to different service types, or correspond to different service priorities; it may be understood that different service types or different service priorities use different logical channels, or correspond to different DCI formats, or correspond to contents carried by different DCIs.

Herein different logical channels or different logical channel groups correspond to different RNTIs configured to scramble downlink control information; downlink control information formats corresponding to different logical channels or different logical channel groups are different; and contents carried by the downlink control information corresponding to different logical channels or different logical channel groups are different.

As an implementation, the configuring, by the terminal, the first mapping relationship between the logical channel and the physical layer service identifier includes: configuring, based on a preappointed manner, the first mapping relationship between the logical channel and the physical layer service identifier for the terminal; and the configuring the second mapping relationship between the logical channel group and the physical layer service identifier includes: configuring, based on a preappointed manner, the second mapping relationship between the logical channel group and the physical layer service identifier for the terminal.

As another implementation, the configuring, by the terminal, the first mapping relationship between the logical channel and the physical layer service identifier includes: receiving, by the terminal, the first mapping relationship sent by a network device; the configuring the second mapping relationship between the logical channel group and the physical layer service identifier includes: receiving, by the terminal, the second mapping relationship sent by the network device.

As an example, the terminal may receive the first mapping relationship sent by the network device through high-layer signaling, or receive the second mapping relationship sent by the network device through high-layer signaling.

In an optional embodiment of the disclosure, the method further includes: in S202: determining, by the terminal according to the received first downlink control information, a corresponding first physical layer service identifier; and In S203: mapping, by the terminal according to the first mapping relationship, data to the logical channel corresponding to the first physical layer service identifier, or mapping, by the terminal according to the second mapping relationship, data to the logical channel group corresponding to the first physical layer service identifier.

In an optional embodiment of the disclosure, the method further includes: receiving, by the terminal, at least one set of aggregation factor parameters sent by the network device; the aggregation factor parameter representing times of transmitting at least one of uplink data or downlink data repeatedly.

The method further includes: configuring, by the terminal, a third mapping relationship between the physical layer service identifier and the aggregation factor parameter; or configuring, by the terminal, a fourth mapping relationship between a physical layer service identifier group and the aggregation factor parameter; herein the physical layer service identifier group includes at least one physical layer service identifier.

Here the aggregation factor parameter may be specifically a pdsch/pusch-AggregationFactor parameter, which represents times of transmitting at least one of uplink data or downlink data repeatedly. The pdsch/pusch-AggregationFactor parameter is located in PUSCH configuration information and PDSCH configuration information, for example, it may be configured as 2, 4, 8, and configured as 1 by default, which represents times of repetition of TB. When it is configured as 4, it represents that transmission is repeated 4 times seccessively in one scheduling.

Herein as an implementation, the configuring, by the terminal, the third mapping relationship between the physical layer service identifier and the aggregation factor parameter includes: configuring, by the terminal according to a predefined manner, the third mapping relationship between the physical layer service identifier and the aggregation factor parameter; and the configuring, by the terminal, the fourth mapping relationship between the physical layer service identifier group and the aggregation factor parameter includes: configuring, by the terminal according to a predefined manner, the fourth mapping relationship between the physical layer service identifier group and the aggregation factor parameter.

Herein different aggregation factor parameters correspond to different RNTIs configured to scramble downlink control information; downlink control information formats corresponding to different aggregation factor parameters are different; and contents carried by the downlink control information corresponding to different aggregation factor parameters are different.

In an optional embodiment of the disclosure, the method further includes: determining, by the terminal according to the received second downlink control information, a corresponding second physical layer service identifier; determining, by the terminal according to the third mapping relationship or the fourth mapping relationship, a first aggregation factor parameter corresponding to the second physical layer service identifier; and transmitting, by the terminal according to the first aggregation factor parameter, data.

According to the technical solution of the embodiment of the disclosure, on one hand, configuring, by the network device or the terminal, the first mapping relationship between the logical channel and the physical layer service identifier, or the second mapping relationship between the logical channel group and the physical layer service identifier, so that different logical channels or different logical channel groups are used for different physical layer service identifiers, which ensures service requirements and improves system throughput. On the other hand, configuring, by the network device or the terminal, the third mapping relationship between the physical layer service identifier and the aggregation factor parameter; or the fourth mapping relationship between the physical layer service identifier group and the aggregation factor parameter, and the aggregation factor parameter representing times of transmitting at least one of uplink data or downlink data repeatedly; so that different aggregation factor parameters are mapped to different physical layer service identifiers, for services with lower reliability requirements, they correspond to smaller aggregation factor parameters, and for services with higher reliability requirements, they correspond to larger aggregation factor parameters, which avoids wasting of resources caused by configuring the same aggregation factor parameter and improves the system throughput.

Figure 3:
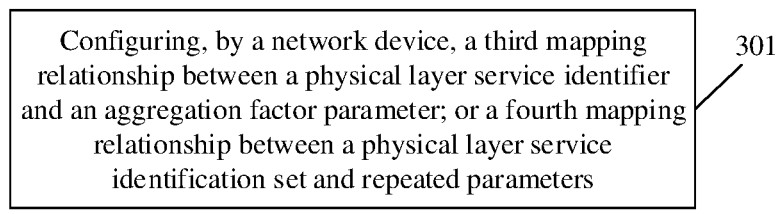
FIG. 3 is a first schematic flowchart of a method for transmitting data according to an embodiment of the disclosure.

The embodiment of the disclosure also provides a method for transmitting data. FIG. 3 is a first schematic flowchart of a method for transmitting data according to an embodiment of the disclosure; as shown in FIG. 3, the method includes:

In S301: configuring, by a network device, a third mapping relationship between a physical layer service identifier and an aggregation factor parameter; or a fourth mapping relationship between a physical layer service identifier group and the aggregation factor parameter; herein the aggregation factor parameter represents times of transmitting at least one of uplink data or downlink data repeatedly; and the physical layer service identifier group includes at least one physical layer service identifier.

In an optional embodiment of the disclosure, the method further includes before configuring, by the network device, the third mapping relationship between the physical layer service identifier and the aggregation factor parameter; or the fourth mapping relationship between the physical layer service identifier group and the aggregation factor parameter: configuring, by the network device, at least one set of aggregation factor parameters; and sending, by the network device, the at least one set of aggregation factor parameters to a terminal.

In the embodiment, the configuring, by the network device, the third mapping relationship between the physical layer service identifier and the aggregation factor parameter includes: configuring, by the network device according to a predefined manner, the third mapping relationship between the physical layer service identifier and the aggregation factor parameter; and the configuring, by the network device, the fourth mapping relationship between the physical layer service identifier group and the aggregation factor parameter includes: configuring, by the network device according to a predefined manner, the fourth mapping relationship between the physical layer service identifier group and the aggregation factor parameter.

In an optional embodiment of the disclosure, the method further includes: configuring, by the network device, a first mapping relationship between a logical channel and the physical layer service identifier, or a second mapping relationship between a logical channel group and the physical layer service identifier.

In an optional embodiment of the disclosure, the method further includes: sending, by the network device, at least one of the first mapping relationship or the second mapping relationship to a terminal.

In an optional embodiment of the disclosure, the method further includes: determining, by the network device according to the first mapping relationship, the physical layer service identifier corresponding to the logical channel where data is located; or, determining, by the network device according to the second mapping relationship, the physical layer service identifier corresponding to the logical channel group where data is located; and scheduling, by the network device according to first downlink control information corresponding to the physical layer service identifier, the data.

In the embodiment, the physical layer service identifier includes: Radio Network Temporary Identifier (RNTI) configured to scramble downlink control information, downlink control information format, content carried by the downlink control information.

Herein different logical channels or different logical channel groups correspond to different RNTIs configured to scramble downlink control information; different logical channels or different logical channel groups correspond to different downlink control information formats; and contents carried by the downlink control information corresponding to different logical channels or different logical channel groups are different.

According to the technical solution of the embodiment of the disclosure, on one hand, configuring, by the network device or the terminal, the first mapping relationship between the logical channel and the physical layer service identifier, or the second mapping relationship between the logical channel group and the physical layer service identifier, so that different logical channels or different logical channel groups are used for different physical layer service identifiers, which ensures service requirements and improves system throughput. On the other hand, configuring, by the network device or the terminal, the third mapping relationship between the physical layer service identifier and the aggregation factor parameter; or the fourth mapping relationship between the physical layer service identifier group and the aggregation factor parameter, and the aggregation factor parameter representing times of transmitting at least one of uplink data or downlink data repeatedly; so that different aggregation factor parameters are mapped to different physical layer service identifiers, for services with lower reliability requirements, they correspond to smaller aggregation factor parameters, and for services with higher reliability requirements, they correspond to larger aggregation factor parameters, which avoids wasting of resources caused by configuring the same aggregation factor parameter and improves the system throughput.

Figure 4:
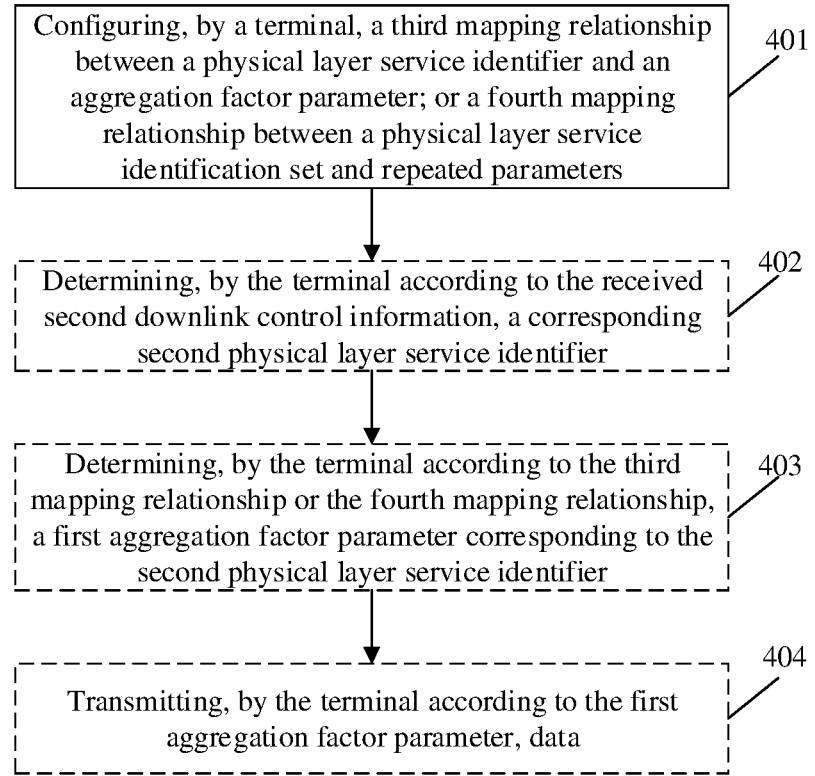
FIG. 4 is a second schematic flowchart of a method for transmitting data according to an embodiment of the disclosure.

The embodiment of the disclosure also provides a method for transmitting data. FIG. 4 is a second schematic flowchart of a method for transmitting data according to an embodiment of the disclosure; as shown in FIG. 4, the method includes:

In S401: configuring, by a terminal, a third mapping relationship between a physical layer service identifier and an aggregation factor parameter; or a fourth mapping relationship between a physical layer service identifier group and the aggregation factor parameter; herein the aggregation factor parameter represents times of transmitting at least one of uplink data or downlink data repeatedly; and the physical layer service identifier group includes at least one physical layer service identifier.

In an optional embodiment of the disclosure, the method also includes before configuring, by the terminal, the third mapping relationship between the physical layer service identifier and the aggregation factor parameter; or the fourth mapping relationship between the physical layer service identifier group and the aggregation factor parameter: receiving, by the terminal, at least one set of aggregation factor parameters sent by the network device.

As an implementation, the configuring, by the terminal, the third mapping relationship between the physical layer service identifier and the aggregation factor parameter includes: configuring, by the terminal according to a predefined manner, the third mapping relationship between the physical layer service identifier and the aggregation factor parameter. The configuring, by the terminal, the fourth mapping relationship between the physical layer service identifier group and the aggregation factor parameter includes: configuring, by the terminal according to a predefined manner, the fourth mapping relationship between the physical layer service identifier group and the aggregation factor parameter In an optional embodiment of the disclosure, the method further includes: in S402: determining, by the terminal according to the received second downlink control information, a corresponding second physical layer service identifier;

In S403: determining, by the terminal according to the third mapping relationship or the fourth mapping relationship, a first aggregation factor parameter corresponding to the second physical layer service identifier; and In S404: transmitting, by the terminal according to the first aggregation factor parameter, data.

In the embodiment, the physical layer service identifier includes: Radio Network Temporary Identifier (RNTI) configured to scramble downlink control information, downlink control information format, content carried by the downlink control information.

Herein different aggregation factor parameters correspond to different RNTIs configured to scramble downlink control information; downlink control information formats corresponding to different aggregation factor parameters are different; and contents carried by the downlink control information corresponding to different aggregation factor parameters are different.

In an optional embodiment of the disclosure, the method further includes: configuring, by the terminal, a first mapping relationship between a logical channel and the physical layer service identifier, or a second mapping relationship between a logical channel group and the physical layer service identifier.

Herein different logical channels or different logical channel groups correspond to different RNTIs configured to scramble downlink control information; downlink control information formats corresponding to different logical channels or different logical channel groups are different; and contents carried by the downlink control information corresponding to different logical channels or different logical channel groups are different.

As an implementation, the configuring, by the terminal, the first mapping relationship between the logical channel and the physical layer service identifier includes: configuring, based on a preappointed manner, the first mapping relationship between the logical channel and the physical layer service identifier for the terminal; and the configuring the second mapping relationship between the logical channel group and the physical layer service identifier includes: configuring, based on a preappointed manner, the second mapping relationship between the logical channel group and the physical layer service identifier for the terminal.

As another implementation, the configuring, by the terminal, the first mapping relationship between the logical channel and the physical layer service identifier includes: receiving, by the terminal, the first mapping relationship sent by a network device; the configuring the second mapping relationship between the logical channel group and the physical layer service identifier includes: receiving, by the terminal, the second mapping relationship sent by the network device.

In an optional embodiment of the disclosure, the method further includes: determining, by the terminal according to the received first downlink control information, a corresponding first physical layer service identifier; and mapping, by the terminal according to the first mapping relationship, data to the logical channel corresponding to the first physical layer service identifier, or mapping, by the terminal according to the second mapping relationship, data to the logical channel group corresponding to the first physical layer service identifier.

According to the technical solution of the embodiment of the disclosure, on one hand, configuring, by the network device or the terminal, the first mapping relationship between the logical channel and the physical layer service identifier, or the second mapping relationship between the logical channel group and the physical layer service identifier, so that different logical channels or different logical channel groups are used for different physical layer service identifiers, which ensures service requirements and improves system throughput. On the other hand, configuring, by the network device or the terminal, the third mapping relationship between the physical layer service identifier and the aggregation factor parameter; or the fourth mapping relationship between the physical layer service identifier group and the aggregation factor parameter, and the aggregation factor parameter representing times of transmitting at least one of uplink data or downlink data repeatedly; so that different aggregation factor parameters are mapped to different physical layer service identifiers, for services with lower reliability requirements, they correspond to smaller aggregation factor parameters, and for services with higher reliability requirements, they correspond to larger aggregation factor parameters, which avoids wasting of resources caused by configuring the same aggregation factor parameter and improves the system throughput.

The disclosure will be described in detail below in conjunction with specific examples.

First Example

Limitation of RNTI is added in logical channel configuration. There are two logical channel configurations as follows: logical channel 1 (its priority is configured as 1, allowing RNTI to be configured as new RNTI, Cell-Radio Network Temporary Identifier (C-RNTI), Configured Scheduling-Radio Network Temporary Identifier (CS-RNTI)); logical channel 2 (its priority is configured as 1, allowing RNTI to be configured as C-RNTI, CS-RNTI), at the moment, when the terminal has uplink data of logical channel 2, only scheduling of DCI scrambled by C-RNTI and CS-RNTI may be used, and scheduling of DCI scrambled by new RNTI cannot be used.

Second Example

Limitation of DCI format is added in logical channel configuration, it is assumed that DCI format m is configured to schedule data with high service priority, and DCI format n is configured to schedule data with low service priority. There are two logical channel configurations as follows: logical channel 1 (its priority is configured as 1, allowing DCI format to be configured as DCI format m, DCI format n); logical channel 2 (its priority is configured as 1, allowing DCI format to be configured as DCI format n), at the moment, when the terminal has uplink data of logical channel 2, only scheduling of DCI format n may be used, and scheduling of DCI format m cannot be used.

Third Example

Limitation of information carried by DCI is added in logical channel configuration, it is assumed that there is a domain that identifies services in DCI, one status represents URLLC, and the other status represents eMBB. There are two logical channel configurations as follows: logical channel 1 (its priority is configured as 1, allowing DCI to be configured as URLLC, eMBB); logical channel 2 (its priority is configured as 1, allowing DCI to be configured as eMBB), at the moment, when the terminal has uplink data of logical channel 2, DCI for scheduling URLLC service cannot be used.

Fourth Example

The base station configures, through high-level signaling, two sets of pdsch/pusch-AggregationFactor for the terminal, they are 4 and 2 respectively, corresponding to PUSCH/PDSCH scheduled by DCI scrambled by new RNTI and PUSCH/PDSCH scheduled by DCI scrambled by other RNTIs, respectively; when the terminal receives uplink/downlink data scheduled by DCI scrambled by the new RNTI, times of repeated transmission is 4; and when the terminal receives uplink/downlink data scheduled by DCI scrambled by other RNTIs, times of repeated transmission is 2.

Fifth Example

The base station configures, through high-level signaling, two sets of pdsch/pusch-AggregationFactor for the terminal, they are 4 and 2 respectively, corresponding to PUSCH/PDSCH scheduled by DCI format m for scheduling URLLC and PUSCH/PDSCH scheduled by DCI format n for scheduling eMBB, respectively; when the terminal receives uplink/downlink data scheduled by DCI format m, times of repeated transmission is 4; and when the terminal receives uplink/downlink data scheduled by DCI format n, times of repeated transmission is 2.

Sixth Example

The base station configures, through high-level signaling, two sets of pdsch/pusch-AggregationFactor for the terminal, they are 4 and 2 respectively, it is assumed that there is a domain that identifies services in DCI, one status represents URLLC, and the other status represents eMBB, times of repetition of the two sets correspond to two statuses of the domain that identifies services in DCI respectively; when the terminal receives uplink/downlink data scheduled by DCI where the domain that identifies services is URLLC, times of repeated transmission is 4; and when the terminal receives uplink/downlink data scheduled by DCI where the domain that identifies services is eMBB, times of repeated transmission is 2.

Figure 5:
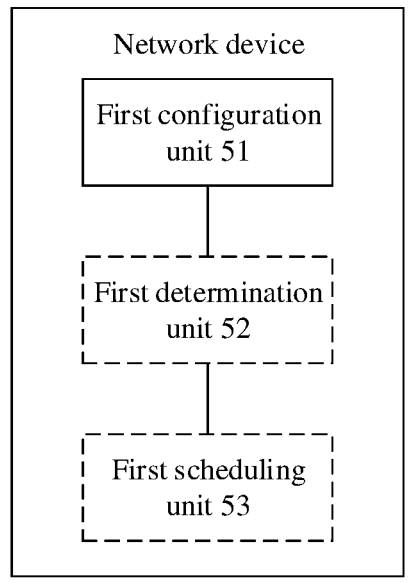
FIG. 5 is a first schematic diagram of the composition structure of a network device according to an embodiment of the disclosure.

The embodiment of the disclosure also provides a network device. FIG. 5 is a first schematic diagram of the composition structure of a network device according to an embodiment of the disclosure; as shown in FIG. 5, the network device includes a first configuration unit 51 configured to configure a first mapping relationship between a logical channel and a physical layer service identifier, or a second mapping relationship between a logical channel group and the physical layer service identifier.

In an optional embodiment of the disclosure, the network device further includes a first determination unit 52 and a first scheduling unit 53.

Herein, the first determination unit 52 is configured to determine, according to the first mapping relationship, the physical layer service identifier corresponding to the logical channel where data is located; or, to determine, according to the second mapping relationship, the physical layer service identifier corresponding to the logical channel group where data is located.

The first scheduling unit 53 is configured to schedule, according to first downlink control information corresponding to the physical layer service identifier, the data.

In the embodiment, the physical layer service identifier includes: Radio Network Temporary Identifier (RNTI) configured to scramble downlink control information, downlink control information format, content carried by the downlink control information.

As an example, different logical channels or different logical channel groups correspond to different RNTIs configured to scramble downlink control information;
  different logical channels or different logical channel groups correspond to different downlink control information formats; and
  contents carried by the downlink control information corresponding to different logical channels or different logical channel groups are different.

Figure 6:
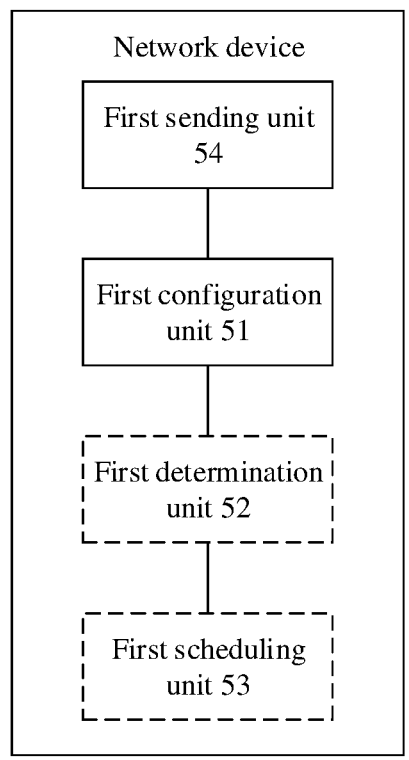
FIG. 6 is a second schematic diagram of the composition structure of a network device according to an embodiment of the disclosure.

In an optional embodiment of the disclosure, as shown in FIG. 6, the network device further includes a first sending unit 54 configured to send at least one of the first mapping relationship or the second mapping relationship to a terminal.

In an optional embodiment of the disclosure, as shown in FIG. 6, the network device further includes a first sending unit 54.

The first configuration unit 51 is configured to configure at least one set of aggregation factor parameters; the aggregation factor parameter representing times of transmitting at least one of uplink data or downlink data repeatedly; and
  the first sending unit 54 is configured to send the at least one set of aggregation factor parameters to a terminal.

In an optional embodiment of the disclosure, the first configuration unit 51 is further configured to configure a third mapping relationship between the physical layer service identifier and the aggregation factor parameter; or, to configure a fourth mapping relationship between a physical layer service identifier group and the aggregation factor parameter; herein the physical layer service identifier group includes at least one physical layer service identifier.

As an implementation, the first configuration unit 51 is configured to configure, according to a predefined manner, the third mapping relationship between the physical layer service identifier and the aggregation factor parameter; or, to configure, according to a predefined manner, the fourth mapping relationship between the physical layer service identifier group and the aggregation factor parameter.

In the embodiment of the disclosure, all the first configuration unit 51, the first determination unit 52 and the first scheduling unit 53 in the network device may be implemented by Central Processing Unit (CPU), Digital Signal Processor (DSP), Microcontroller Unit (MCU) or Field-Programmable Gate Array (FPGA) in the network device, in actual applications; and the first sending unit 54 in the network device may be implemented by communication modules (including basic communication suite, operating system, communication module, standardized interface and protocol, etc.) and a transceiver antenna, in actual applications.

The embodiment of the disclosure also provides a network device, including a memory, a processor, and a computer program stored on the memory and executable on the processor, the processor implements steps of the method for scheduling data applied to the network device according to the embodiment of the disclosure when executing the program.

It should be noted that when the network device provided by the above embodiment performs data scheduling, the division of the above program modules is described as an example only. In actual applications, the above processing may be allocated to be done by different program modules as needed, that is, the internal structure of the network device is divided into different program modules to complete all or a part of the processing as described above. Furthermore, the network device provided by the above embodiment and the method embodiment for scheduling data belong to the same concept, and the specific implementation thereof is detailed in the method embodiment, which will not be repeated here.

Figure 7:
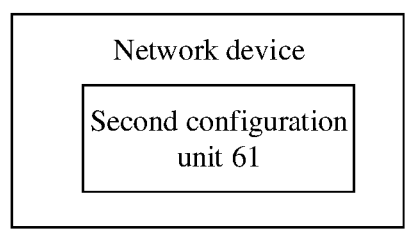
FIG. 7 is a first schematic diagram of the composition structure of another network device according to an embodiment of the disclosure.

The embodiment of the disclosure also provides a network device. FIG. 7 is a first schematic diagram of the composition structure of another network device according to an embodiment of the disclosure; as shown in FIG. 7, the network device includes a second configuration unit 61 configured to configure a third mapping relationship between a physical layer service identifier and an aggregation factor parameter; or, to configure a fourth mapping relationship between a physical layer service identifier group and the aggregation factor parameter.

Herein, the aggregation factor parameter represents times of transmitting at least one of uplink data or downlink data repeatedly; and the physical layer service identifier group includes at least one physical layer service identifier.

In the embodiment, the second configuration unit 61 is configured to configure, according to a predefined manner, the third mapping relationship between the physical layer service identifier and the aggregation factor parameter; or, to configure, according to a predefined manner, the fourth mapping relationship between the physical layer service identifier group and the aggregation factor parameter.

In an optional embodiment of the disclosure, the network device further includes a second sending unit;
the second configuration unit 61 is further configured to before configuring, by the second configuration unit 61, the third mapping relationship between the physical layer service identifier and the aggregation factor parameter; or the fourth mapping relationship between the physical layer service identifier group and the aggregation factor parameter, configure at least one set of aggregation factor parameters;
the second sending unit is configured to send the at least one set of aggregation factor parameters to a terminal In an optional embodiment of the disclosure, the second configuration unit 61 is further configured to configure a first mapping relationship between a logical channel and the physical layer service identifier, or a second mapping relationship between a logical channel group and the physical layer service identifier.

Figure 8:
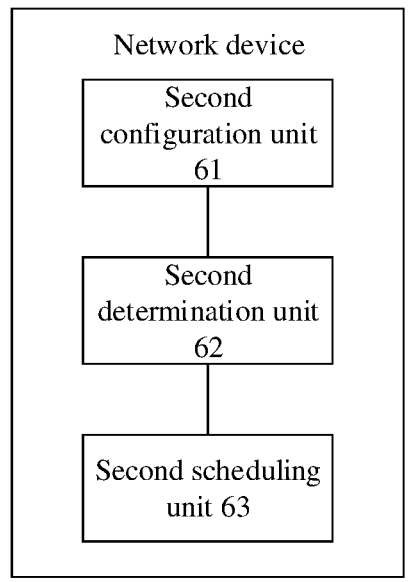
FIG. 8 is a second schematic diagram of the composition structure of another network device according to an embodiment of the disclosure.

In an optional embodiment of the disclosure, as shown in FIG. 8, the network device further includes a second determination unit 62 and a second scheduling unit 63.

Herein, the second determination unit 62 is configured to determine, according to the first mapping relationship, the physical layer service identifier corresponding to the logical channel where data is located; or, to determine, according to the second mapping relationship, the physical layer service identifier corresponding to the logical channel group where data is located.

The second scheduling unit 63 is configured to schedule, according to first downlink control information corresponding to the physical layer service identifier, the data.

In the embodiment, the physical layer service identifier includes: Radio Network Temporary Identifier (RNTI) configured to scramble downlink control information, downlink control information format, content carried by the downlink control information.

Herein, different logical channels or different logical channel groups correspond to different RNTIs configured to scramble downlink control information;
different logical channels or different logical channel groups correspond to different downlink control information formats; and
contents carried by the downlink control information corresponding to different logical channels or different logical channel groups are different.

In an optional embodiment of the disclosure, the network device further includes a second sending unit configured to send at least one of the first mapping relationship or the second mapping relationship to a terminal.

In the embodiment of the disclosure, all the second configuration unit 61, the second determination unit 62 and the second scheduling unit 63 in the network device may be implemented by CPU, DSP, MCU or FPGA in the network device, in actual applications; and the second sending unit in the network device may be implemented by communication modules (including basic communication suite, operating system, communication module, standardized interface and protocol, etc.) and a transceiver antenna, in actual applications.

The embodiment of the disclosure also provides a network device, including a memory, a processor, and a computer program stored on the memory and executable on the processor, the processor implements steps of the method for transmitting data applied to the network device according to the embodiment of the disclosure when executing the program.

It should be noted that when the network device provided by the above embodiment performs data transmission, the division of the above program modules is described as an example only. In actual applications, the above processing may be allocated to be done by different program modules as needed, that is, the internal structure of the network device is divided into different program modules to complete all or a part of the processing as described above. Furthermore, the network device provided by the above embodiment and the method embodiment for transmitting data belong to the same concept, and the specific implementation thereof is detailed in the method embodiment, which will not be repeated here.

Figure 9:
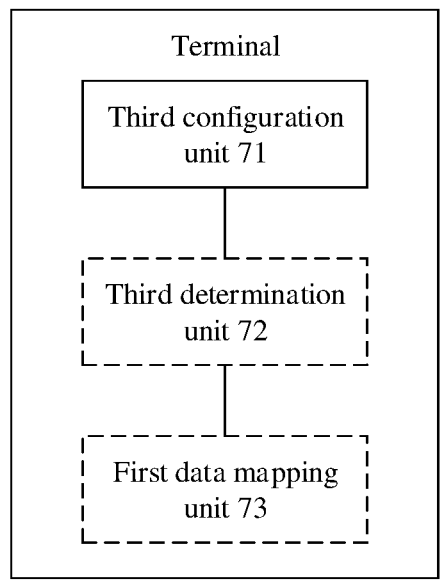
FIG. 9 is a first schematic diagram of the composition structure of a terminal according to an embodiment of the disclosure.

The embodiment of the disclosure also provides a terminal. FIG. 9 is a first schematic diagram of the composition structure of a terminal according to an embodiment of the disclosure; as shown in FIG. 9, the terminal includes a third configuration unit 71 configured to configure a first mapping relationship between a logical channel and a physical layer service identifier, or a second mapping relationship between a logical channel group and the physical layer service identifier.

In an optional embodiment of the disclosure, the terminal further includes a third determination unit 72 and a first data mapping unit 73;
 herein the third determination unit 72 is configured to determine, according to the received first downlink control information, a corresponding first physical layer service identifier; and
 the first data mapping unit 73 is configured to map, according to the first mapping relationship, data to the logical channel corresponding to the first physical layer service identifier, or, to map, according to the second mapping relationship, data to the logical channel group corresponding to the first physical layer service identifier.

In the embodiment, the physical layer service identifier includes: Radio Network Temporary Identifier (RNTI) configured to scramble downlink control information, downlink control information format, content carried by the downlink control information.

Herein different logical channels or different logical channel groups correspond to different RNTIs configured to scramble downlink control information;
 downlink control information formats corresponding to different logical channels or different logical channel groups are different; and
 contents carried by the downlink control information corresponding to different logical channels or different logical channel groups are different.

As an implementation, the third configuration unit 71 is configured to configure, based on a preappointed manner, the first mapping relationship between the logical channel and the physical layer service identifier for the terminal; or, to configure, based on a preappointed manner, the second mapping relationship between the logical channel group and the physical layer service identifier for the terminal.

As another implementation, the third configuration unit 71 is configured to receive the first mapping relationship sent by a network device; or, to receive the second mapping relationship sent by the network device.

In an optional embodiment of the disclosure, the terminal further includes a first transmission unit configured to receive at least one set of aggregation factor parameters sent by the network device; the aggregation factor parameter representing times of transmitting at least one of uplink data or downlink data repeatedly.

In an optional embodiment of the disclosure, the third configuration unit 71 is further configured to configure a third mapping relationship between the physical layer service identifier and the aggregation factor parameter; or, to configure a fourth mapping relationship between a physical layer service identifier group and the aggregation factor parameter; herein the physical layer service identifier group includes at least one physical layer service identifier.

Herein as an implementation, the third configuration unit 71 is configured to configure, according to a predefined manner, the third mapping relationship between the physical layer service identifier and the aggregation factor parameter; or, to configure, according to a predefined manner, the fourth mapping relationship between the physical layer service identifier group and the aggregation factor parameter.

Figure 10:
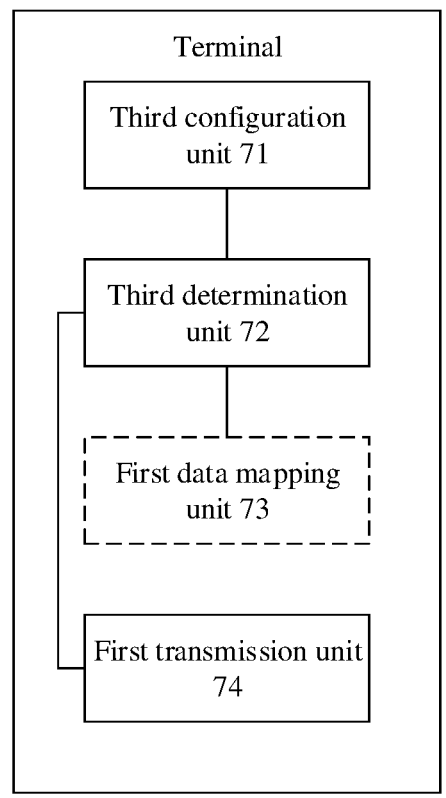
FIG. 10 is a second schematic diagram of the composition structure of a terminal according to an embodiment of the disclosure.

In an optional embodiment of the disclosure, as shown in FIG. 10, the terminal further includes a third determination unit 72 and a first transmission unit 74;
 the third determining unit 72 is configured to determine, according to the received second downlink control information, a corresponding second physical layer service identifier; to determine, according to the third mapping relationship or the fourth mapping relationship, a first aggregation factor parameter corresponding to the second physical layer service identifier; and
 the first transmission unit 74 is configured to transmit data according to the first aggregation factor parameter.

In the embodiment, different aggregation factor parameters correspond to different RNTIs configured to scramble downlink control information;
 downlink control information formats corresponding to different aggregation factor parameters are different; and
 contents carried by the downlink control information corresponding to different aggregation factor parameters are different.

In the embodiment of the disclosure, all the third configuration unit 71, the third determination unit 72 and the first data mapping unit 73 in the terminal may be implemented by CPU, DSP, MCU or FPGA in the terminal, in actual applications; and the first transmission unit 74 in the network device may be implemented by communication modules (including basic communication suite, operating system, communication module, standardized interface and protocol, etc.) and a transceiver antenna, in actual applications.

The embodiment of the disclosure also provides a terminal, including a memory, a processor, and a computer program stored on the memory and executable on the processor, the processor implements steps of the method for scheduling data applied to the terminal according to the embodiment of the disclosure when executing the program.

It should be noted that when the terminal provided by the above embodiment performs data scheduling, the division of the above program modules is described as an example only. In actual applications, the above processing may be allocated to be done by different program modules as needed, that is, the internal structure of the terminal is divided into different program modules to complete all or a part of the processing as described above. Furthermore, the terminal provided by the above embodiment and the method embodiment for scheduling data belong to the same concept, and the specific implementation thereof is detailed in the method embodiment, which will not be repeated here.

Figure 11:
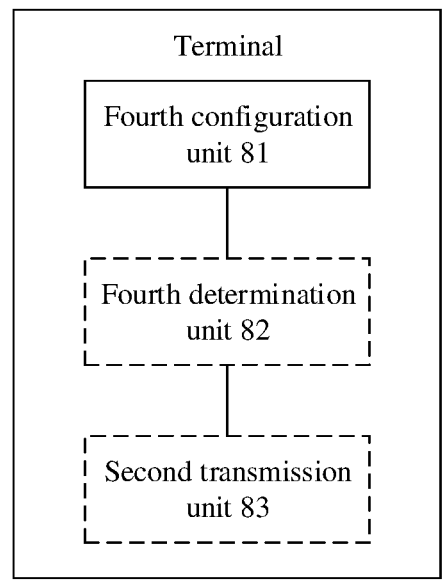
FIG. 11 is a first schematic diagram of the composition structure of another terminal according to an embodiment of the disclosure.

The embodiment of the disclosure also provides a terminal. FIG. 11 is a first schematic diagram of the composition structure of another terminal according to an embodiment of the disclosure; as shown in FIG. 11, the terminal includes a fourth configuration unit 81 configured to configure a third mapping relationship between a physical layer service identifier and an aggregation factor parameter; or a fourth mapping relationship between a physical layer service identifier group and the aggregation factor parameter; herein the aggregation factor parameter represents times of transmitting at least one of uplink data or downlink data repeatedly; and the physical layer service identifier group includes at least one physical layer service identifier.

As an implementation, the fourth configuration unit 81 is configured to configure, according to a predefined manner, the third mapping relationship between the physical layer service identifier and the aggregation factor parameter; or, to configure, according to a predefined manner, the fourth mapping relationship between the physical layer service identifier group and the aggregation factor parameter.

In an optional embodiment of the disclosure, the terminal further includes a second transmission unit configured to before configuring, by the fourth configuration unit 81, the third mapping relationship between the physical layer service identifier and the aggregation factor parameter; or the fourth mapping relationship between the physical layer service identifier group and the aggregation factor parameter: receive at least one set of aggregation factor parameters sent by the network device.

In an optional embodiment of the disclosure, the terminal further includes a fourth determination unit 82 and a second transmission unit 83, herein the fourth determination unit 82 is configured to determine, according to the received second downlink control information, a corresponding second physical layer service identifier; to determine, according to the third mapping relationship or the fourth mapping relationship, a first aggregation factor parameter corresponding to the second physical layer service identifier; and the second transmission unit 83 is configured to transmit data according to the first aggregation factor parameter.

In the embodiment, the physical layer service identifier includes: Radio Network Temporary Identifier (RNTI) configured to scramble downlink control information, downlink control information format, content carried by the downlink control information.

Herein different aggregation factor parameters correspond to different RNTIs configured to scramble downlink control information;
downlink control information formats corresponding to different aggregation factor parameters are different; and
contents carried by the downlink control information corresponding to different aggregation factor parameters are different.

In an optional embodiment of the disclosure, the fourth configuration unit 81 is further configured to configure a first mapping relationship between a logical channel and the physical layer service identifier, or a second mapping relationship between a logical channel group and the physical layer service identifier.

Figure 12:
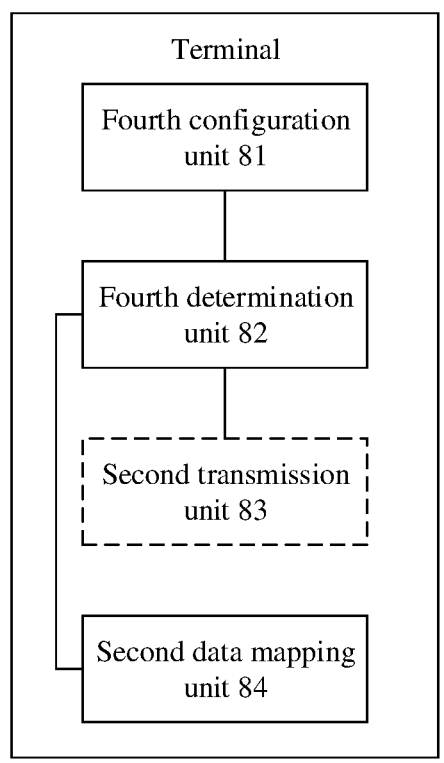
FIG. 12 is a second schematic diagram of the composition structure of another terminal according to an embodiment of the disclosure.

In an optional embodiment of the disclosure, as shown in FIG. 12, the terminal further includes a fourth determination unit 82 and a second data mapping unit 84;
herein the fourth determination unit 82 is configured to determine, according to the received first downlink control information, a corresponding first physical layer service identifier; and
the second data mapping unit 84 is configured to map, according to the first mapping relationship, data to the logical channel corresponding to the first physical layer service identifier, or, to map, according to the second mapping relationship, data to the logical channel group corresponding to the first physical layer service identifier.

In the embodiment, different logical channels or different logical channel groups correspond to different RNTIs configured to scramble downlink control information;
downlink control information formats corresponding to different logical channels or different logical channel groups are different; and
contents carried by the downlink control information corresponding to different logical channels or different logical channel groups are different.

As an implementation, the fourth configuration unit 81 is configured to configure, based on a preappointed manner, the first mapping relationship between the logical channel and the physical layer service identifier for the terminal; or, to configure, based on a preappointed manner, the second mapping relationship between the logical channel group and the physical layer service identifier for the terminal.

As another implementation, the fourth configuration unit 81 is further configured to receive the first mapping relationship sent by a network device; or, to receive the second mapping relationship sent by the network device.

In the embodiment of the disclosure, all the fourth configuration unit 81, the fourth determination unit 82 and the second data mapping unit 84 in the terminal may be implemented by CPU, DSP, MCU or FPGA in the terminal, in actual applications; and the second transmission unit 83 in the network device may be implemented by communication modules (including basic communication suite, operating system, communication module, standardized interface and protocol, etc.) and a transceiver antenna, in actual applications.

The embodiment of the disclosure also provides a terminal, including a memory, a processor, and a computer program stored on the memory and executable on the processor, the processor implements steps of the method for transmitting data applied to the terminal according to the embodiment of the disclosure when executing the program.

It should be noted that when the terminal provided by the above embodiment performs data transmission, the division of the above program modules is described as an example only. In actual applications, the above processing may be allocated to be done by different program modules as needed, that is, the internal structure of the terminal is divided into different program modules to complete all or a part of the processing as described above. Furthermore, the terminal provided by the above embodiment and the method embodiment for transmitting data belong to the same concept, and the specific implementation thereof is detailed in the method embodiment, which will not be repeated here.

In the embodiment, it may be understood that the memory may be a volatile memory or a non-volatile memory, and may also include both volatile memory and non-volatile memory. Herein the non-volatile memory may be Read Only Memory (ROM), Programmable Read-Only Memory (PROM), Erasable Programmable Read-Only Memory (EPROM), Electrically Erasable Programmable Read-Only Memory (EEPROM), Ferromagnetic Random Access Memory (FRAM), Flash Memory, magnetic surface memory, optical disk, or Compact Disc Read-Only Memory (CD-ROM); the magnetic surface memory may be magnetic disk memory or magnetic tape memory. The volatile memory may be Random Access Memory (RAM), which is used as an external cache. By way of exemplary but not limiting description, many forms of RAMs are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRS-DRAM), Enhanced Synchronous Dynamic Random Access Memory (ESDRAM), SyncLink Dynamic Random Access Memory (SLDRAM), Direct Rambus Random Access Memory (DRRAM). The memories described in the embodiments of the disclosure are intended to include, but are not limited to, these and any other suitable types of memories.

In the embodiment, it may be understood that the above methods disclosed by the embodiments of the disclosure may be applied to a processor or implemented by the processor. The processor may be an integrated circuit chip with signal processing capabilities. In the implementation, the steps of the above methods may be completed by integrated logic circuits of hardware in the processor or instructions in the form of software. The above processor may be a general-purpose processor, DSP, or other programmable logic devices, discrete gates or transistor logic devices, discrete hardware device etc. The processor may implement or execute the methods, steps, and logical block diagrams disclosed by the embodiments of the disclosure. The general-purpose processor may be a microprocessor or any conventional processor etc. For the steps of the methods disclosed by the embodiments of the disclosure, they may be embodied directly as being executed and completed by a hardware decoding processor, or executed and completed by a combination of hardware and software modules in the decoding processor. The software module may be located in a storage medium, and the storage medium is located in a memory, the processor reads information in the memory, and completes the steps of the aforemetioned methods in combination with hardware thereof.

The embodiment of the disclosure also provides a computer-readable storage medium having stored thereon a computer program that when executed by a processor, implements steps of the method for scheduling data applied to a network device according to the embodiment of the disclosure; or that when executed by a processor, implements steps of the method for scheduling data applied to a terminal according to the embodiment of the disclosure; or that when executed by the processor implements steps of the method for transmitting data applied to a network device according to the embodiment of the disclosure; or that when executed by the processor implements steps of the method for transmitting data applied to a terminal according to the embodiment of the disclosure.

In the embodiments provided by the disclosure, it should be understood that the disclosed device and method may be implemented in other ways. The device embodiment as described above is merely illustrative. For example, the division of the units is only a division based on logical functions, and there may be other divisions in actual implementation, for example: multiple units or components may be combined, or may be integrated into another system, or some features may be ignored or may not be implemented. Furthermore, the coupling, or direct coupling, or communication connection between the components shown or discussed may be indirect coupling or communication connection through some interfaces, devices or units, and may be electrical, mechanical or in other forms.

The above units described as separate components may be or may not be physically separate, and the components displayed as units may be or may not be physical units, that is, they may be located in one place or distributed on multiple network units; some or all of the units may be selected according to actual needs to achieve the purpose of the solutions of the embodiments.

Furthermore, all the functional units in the embodiments of the disclosure may be integrated into one processing unit, or each of the units may be used as a unit individually, or two or more of the units may be integrated into one unit; the units as integrated above may be implemented in the form of hardware or in the form of hardware plus software functional units.

Those ordinarily skilled in the art may understand that all or a part of the steps implementing the above method embodiments may be implemented by hardware relevant to program instructions, the aforementioned program may be stored in a computer-readable storage medium, and the program performs steps including the above method embodiments when being executed; and the aforementioned storage medium includes various media that may store program codes, such as mobile storage device, ROM, RAM, magnetic disk, or optical disk etc.

Or, when the above integrated unit of the disclosure is implemented in the form of software function module and sold or used as an independent product, it may also be stored in a computer-readable storage medium. Based on such understanding, the technical solutions of the embodiments of the disclosure may be embodied in the form of software product in essence, or the part that contributes to the related art may be embodied in the form of software product, the computer software product is stored in a storage medium and includes instructions for a computer device (which may be a personal computer, a server, or a network device, etc.) to execute all or a part of the methods described in the embodiments of the disclosure. The aforementioned storage medium includes various media that may store program codes, such as mobile storage device, ROM, RAM, magnetic disk, or optical disk etc.

The above descriptions are only specific implementations of the disclosure, however, the protection scope of the disclosure is not limited thereto, any technicians who are familiar with the technical filed may easily conceive of changes or substitutions within the technical scope disclosed by the disclosure, which should be covered within the protection scope of the disclosure. Therefore, the protection scope of the disclosure should be subject to the protection scope of the claims.

What is claimed is:

1. A method for scheduling data, comprising:
configuring, by a network device, a first mapping relationship between a logical channel and a physical layer service identifier, or a second mapping relationship between a logical channel group and the physical layer service identifier, wherein the physical layer service identifier comprises content carried by downlink control information;
configuring, by the network device, at least one set of aggregation factor parameters, an aggregation factor parameter representing times of transmitting uplink data repeatedly;
sending, by the network device, the at least one set of aggregation factor parameters to a terminal; and
configuring, by the network device, a third mapping relationship between the physical layer service identifier and the aggregation factor parameter in the at least one set of aggregation factor parameters; or configuring, by the network device, a fourth mapping relationship between a physical layer service identifier group and the aggregation factor parameter in the at least one set of aggregation factor parameters, wherein the physical layer service identifier group comprises at least one physical layer service identifier.

2. The method of claim 1, further comprising:
  determining, by the network device according to the first mapping relationship, the physical layer service identifier corresponding to the logical channel where data is located; or, determining, by the network device according to the second mapping relationship, the physical layer service identifier corresponding to the logical channel group where the data is located; and
  scheduling, by the network device according to first downlink control information corresponding to the physical layer service identifier, the data.

3. The method of claim 1, further comprising: sending, by the network device, at least one of the first mapping relationship or the second mapping relationship to the terminal.

4. The method of claim 1, wherein the configuring, by the network device, the third mapping relationship between the physical layer service identifier and the aggregation factor parameter in the at least one set of aggregation factor parameters comprises: configuring, by the network device according to a predefined manner, the third mapping relationship between the physical layer service identifier and the aggregation factor parameter in the at least one set of aggregation factor parameters; and
  the configuring, by the network device, the fourth mapping relationship between the physical layer service identifier group and the aggregation factor parameter in the at least one set of aggregation factor parameters comprises: configuring, by the network device according to the predefined manner, the fourth mapping relationship between the physical layer service identifier group and the aggregation factor parameter in the at least one set of aggregation factor parameters.

5. A method for scheduling data, comprising:
  receiving, by a terminal, a first mapping relationship between a logical channel and a physical layer service identifier sent by a network device, or a second mapping relationship between a logical channel group and the physical layer service identifier sent by the network device, wherein the physical layer service identifier comprises content carried by downlink control information;
  receiving, by the terminal, at least one set of aggregation factor parameters sent by the network device, an aggregation factor parameter representing times of transmitting uplink data repeatedly; and
  configuring, by the terminal, a third mapping relationship between the physical layer service identifier and the aggregation factor parameter in the at least one set of aggregation factor parameters; or configuring, by the terminal, a fourth mapping relationship between a physical layer service identifier group and the aggregation factor parameter in the at least one set of aggregation factor parameters, wherein the physical layer service identifier group comprises at least one physical layer service identifier.

6. A network device comprising a memory, a processor, and a computer program stored on the memory and executable on the processor, wherein the processor is configured to execute the computer program to:
  configure a first mapping relationship between a logical channel and a physical layer service identifier, or a second mapping relationship between a logical channel group and the physical layer service identifier, wherein the physical layer service identifier comprises content carried by downlink control information;
  configure at least one set of aggregation factor parameters, an aggregation factor parameter representing times of transmitting uplink data repeatedly;
  send the at least one set of aggregation factor parameters to a terminal; and
  configure a third mapping relationship between the physical layer service identifier and the aggregation factor parameter in the at least one set of aggregation factor parameters; or configure a fourth mapping relationship between a physical layer service identifier group and the aggregation factor parameter in the at least one set of aggregation factor parameters, wherein the physical layer service identifier group comprises at least one physical layer service identifier.

7. The network device of claim 6, wherein the processor is further configured to execute the computer program to:
  determine, according to the first mapping relationship, the physical layer service identifier corresponding to the logical channel where data is located; or, to determine, according to the second mapping relationship, the physical layer service identifier corresponding to the logical channel group where the data is located; and
  schedule, according to first downlink control information corresponding to the physical layer service identifier, the data.

8. The network device of claim 6, wherein the processor is further configured to execute the computer program to send at least one of the first mapping relationship or the second mapping relationship to the terminal.

9. A terminal comprising a memory, a processor, and a computer program stored on the memory and executable on the processor, wherein the processor is configured to execute the computer program to:
  receive a first mapping relationship between a logical channel and a physical layer service identifier sent by a network device, or a second mapping relationship between a logical channel group and the physical layer service identifier sent by the network device, wherein the physical layer service identifier comprises content carried by downlink control information;
  receive at least one set of aggregation factor parameters sent by the network device, an aggregation factor parameter representing times of transmitting uplink data repeatedly; and
  configure a third mapping relationship between the physical layer service identifier and the aggregation factor parameter in the at least one set of aggregation factor parameters; or configure a fourth mapping relationship between a physical layer service identifier group and the aggregation factor parameter in the at least one set of aggregation factor parameters, wherein the physical layer service identifier group comprises at least one physical layer service identifier.

10. The method of claim 1, wherein the physical layer service identifier comprises: Radio Network Temporary Identifier (RNTI) configured to scramble the downlink control information, downlink control information format, and content carried by the downlink control information.

11. The method of claim 10, wherein different logical channels or different logical channel groups correspond to different RNTIs configured to scramble the downlink control information;
  the different logical channels or the different logical channel groups correspond to different downlink control information formats; and contents carried by the downlink control information corresponding to the different logical channels or the different logical channel groups are different.

12. The method of claim 5, wherein the physical layer service identifier comprises: Radio Network Temporary Identifier (RNTI) configured to scramble the downlink control information, downlink control information format, and content carried by the downlink control information.

13. The method of claim 12, wherein different logical channels or different logical channel groups correspond to different RNTIs configured to scramble the downlink control information;
the different logical channels or the different logical channel groups correspond to different downlink control information formats; and
contents carried by the downlink control information corresponding to the different logical channels or the different logical channel groups are different.

14. The network device of claim 6, wherein the physical layer service identifier comprises: Radio Network Temporary Identifier (RNTI) configured to scramble the downlink control information, downlink control information format, and content carried by the downlink control information.

15. The network device of claim 14, wherein different logical channels or different logical channel groups correspond to different RNTIs configured to scramble the downlink control information;
the different logical channels or the different logical channel groups correspond to different downlink control information formats; and
contents carried by the downlink control information corresponding to the different logical channels or the different logical channel groups are different.

16. The network device of claim 6, wherein the processor is further configured to execute the computer program to:
configure, according to a predefined manner, the third mapping relationship between the physical layer service identifier and the aggregation factor parameter in the at least one set of aggregation factor parameters; and
configure, according to the predefined manner, the fourth mapping relationship between the physical layer service identifier group and the aggregation factor parameter in the at least one set of aggregation factor parameters.

17. The terminal of claim 9, wherein the physical layer service identifier comprises: Radio Network Temporary Identifier (RNTI) configured to scramble the downlink control information, downlink control information format, and content carried by the downlink control information.

18. The network device of claim 17, wherein different logical channels or different logical channel groups correspond to different RNTIs configured to scramble the downlink control information;
the different logical channels or the different logical channel groups correspond to different downlink control information formats; and
contents carried by the downlink control information corresponding to the different logical channels or the different logical channel groups are different.

* * * * *